(12) United States Patent
Sancewich et al.

(10) Patent No.: US 9,127,593 B2
(45) Date of Patent: Sep. 8, 2015

(54) MODULAR DROP-IN COMBUSTOR ASSEMBLY FOR INDUSTRIAL GAS TURBINE AND METHOD FOR INSTALLATION

(71) Applicants: Glenn E. Sancewich, Cocoa, FL (US); Jose L. Alonso, Debary, FL (US); Daniel E. Ford, Winter Springs, FL (US)

(72) Inventors: Glenn E. Sancewich, Cocoa, FL (US); Jose L. Alonso, Debary, FL (US); Daniel E. Ford, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 304 days.

(21) Appl. No.: 13/670,741

(22) Filed: Nov. 7, 2012

(65) Prior Publication Data

US 2014/0123680 A1    May 8, 2014

(51) Int. Cl.
| | |
|---|---|
| B23P 19/00 | (2006.01) |
| F01D 25/28 | (2006.01) |
| F02C 7/00 | (2006.01) |
| F23R 3/28 | (2006.01) |
| F23R 3/60 | (2006.01) |

(52) U.S. Cl.
CPC . *F02C 7/00* (2013.01); *B23P 19/00* (2013.01); *F01D 25/285* (2013.01); *F23R 3/283* (2013.01); *F23R 3/60* (2013.01); *F05D 2230/60* (2013.01); *F05D 2230/68* (2013.01); *F23R 2900/00017* (2013.01); *Y10T 29/49323* (2015.01)

(58) Field of Classification Search
CPC ........... F23C 5/02; F23C 3/002; F23M 5/025; B23P 19/00; F02C 7/20; F02C 7/32; F23R 3/60; F23R 3/283; F01D 25/285; F05D 2230/60; F05D 2230/64; F05D 2230/68

USPC ............. 60/796, 752, 772, 798, 722; 29/464, 29/709, 711, 712, 791, 700; 431/154, 155
See application file for complete search history.

(56) References Cited

U.S. PATENT DOCUMENTS 5,911,680 A * 6/1999 Takeoka ........................... 60/797
5,921,075 A * 7/1999 Shimoyama et al. ........... 60/797
(Continued)

FOREIGN PATENT DOCUMENTS

| EP | 2070663 A1 | 12/2001 | |
|---|---|---|---|
| EP | 2070663 A1 * | 6/2009 | ................. B25J 9/04 |
| EP | 2236939 A1 | 10/2010 | |
| EP | 25000653 A1 | 9/2012 | |

(Continued)

*Primary Examiner* — Phutthiwat Wongwian
*Assistant Examiner* — Alain Chau (57) ABSTRACT

A preassembled modular drop-in combustor having internal components in conformity with assembly and function specifications prior to and after insertion into an industrial gas turbine access port and internal combustor transition. The combustor assembly maintains conformity with those specifications after insertion into the combustor case if it does not inadvertently impact other turbine components during its installation. Inadvertent impact is avoided by having a combustor service zone proximal the combustor case, enabling slidable insertion of each combustor assembly into its corresponding access port and transition along its corresponding insertion path without contacting other turbine system components. A multi-axis motion combustor handling tool in the combustor service zone, preferably under automatic control, is coupled to each combustor and facilitates precise alignment along the insertion path. Automatic control facilitates consistent repetitive combustor installation and removal by executing a sequence of stored pre-determined manipulation steps.

10 Claims, 8 Drawing Sheets

(56) References Cited

U.S. PATENT DOCUMENTS 6,141,862 A * 11/2000 Matsui et al. .................. 29/714
2011/0000080 A1    1/2011 Arase et al.

FOREIGN PATENT DOCUMENTS

| JP | H10196402 A | 7/1998 |
|----|-------------|--------|
| JP | H10196959 A | 7/1998 |

* cited by examiner

MODULAR DROP-IN COMBUSTOR ASSEMBLY FOR INDUSTRIAL GAS TURBINE AND METHOD FOR INSTALLATION

BACKGROUND OF THE INVENTION

1. Field of the Invention

The invention relates to combustors for industrial gas turbines, and more particularly modular drop-in combustors that are preassembled in conformity with assembly and function specifications prior to installation into an industrial gas turbine.

2. Description of the Prior Art

Known industrial gas turbines utilize replaceable combustors with flanged connections to access ports in the combustor case. In known combustor designs a generally annular-shaped combustor basket has an open tip portion distal the combustor flange that is inserted in nesting fashion into a corresponding combustor transition along an insertion path that is coaxial with the centerlines of the respective access port, combustor basket and transition opening. Insertion is often performed with cranes and/or block and tackle gear to hold combustor weight, in conjunction with human alignment of the combustor basket with its receiving receptacle within the combustor case. The combustor length is much greater than radial clearance between the combustor basket outer circumference and other turbine components that are inside or outside the combustor case. A small yaw deviation of the combustor from the desired insertion path may result in inadvertent impact contact between the combustor and another turbine component—possibly resulting misalignment of combustor internal components (e.g., injectors, instruments, swirlers, nozzles, venturi, etc.) out of conformance with alignment and function specifications. In known turbine designs there is insufficient clearance between a fully assembled combustor and other turbine components that are external the combustor case, so it becomes impossible to align and insert a fully assembled combustor. Fully assembled combustor weight of over 1200 pounds (545 kg) further complicates precise combustor alignment during installation, especially if alignment is primarily performed by human operators.

Given lack of fully assembled combustor installation clearance and alignment complexities that are exacerbated by combustor weight, the known industry solution is to assemble combustor sub components in situ within the combustor case access port during initial assembly, service and field maintenance and insertion of the combustor. Assembly of sub components within a combustor access port to build a complete combustor and subsequent inspection for conformity with alignment/performance specifications is much slower than factory or authorized service facility bench assembly and inspection. Factory and/or service center pre-assembly in a controlled environment may also be performed by dedicated assembly specialists who may have more practical assembly experience and skills than some field personnel who must perform a broader range of repair services. Unfortunately pre assembly of drop in combustors is not feasible if there is insufficient installation clearance for fully assembled units, or if required installation precision alignment cannot be achieved reliably and consistently in the field due to component gross weight or lack of precise alignment fixtures.

There is a need for pre assembled industrial gas turbine combustors that are pre inspected and certified for meeting assembly and functional specifications that thereafter may be field installed as modular drop-in units.

There is another need for industrial gas turbines with sufficient external clearance outside the combustor case that facilitate direct alignment and installation of pre-assembled combustors into combustor case access ports along an installation path without undue risk of inadvertent combustor contact/impact with other turbine components inside or outside the combustor case, that may damage the combustor.

There is an additional need for a combustor handling tool and combustor installation method that facilitate alignment and insertion of heavy pre-assembled combustors, preferably under automatic control, with repeatable manipulation steps. Ideally such a combustor handling tool can remain permanently installed proximal the combustor case access ports for use as needed, or easily transported to and reassembled at various job sites by repair personnel.

SUMMARY OF THE INVENTION

Accordingly, an object of the invention is to provide pre-assembled industrial gas turbine combustors that are pre inspected and certified for meeting assembly and functional specifications that thereafter may be field installed as modular drop-in units.

Another object of the invention is to provide industrial gas turbines with sufficient external clearance outside the combustor case that facilitate direct alignment and installation of pre-assembled combustors into combustor case access ports along an installation path without undue risk of inadvertent combustor contact/impact with other turbine components inside or outside the combustor case, that may damage the combustor.

An additional object of the present invention is to provide a combustor handling tool and method of combustor installation that facilitate alignment and insertion of heavy pre-assembled combustors, preferably under automatic control, with repeatable manipulation steps. Additionally it is desirable for the a combustor handling tool to remain permanently installed proximal the combustor case access ports for use as needed, or easily transported to and reassembled at various job sites by repair personnel.

These and other objects are achieved in accordance with the present invention by a preassembled modular drop-in combustor having internal components in conformity with assembly and function specifications prior to and after insertion into an industrial gas turbine access port and internal combustor transition. The combustor assembly maintains conformity with those specifications after insertion into the combustor case if it does not inadvertently impact other turbine components during its installation. Inadvertent impact is avoided by having a combustor service zone proximal the combustor case, enabling slidable insertion of each combustor assembly into its corresponding access port and transition along its corresponding insertion path without contacting other turbine system components. A multi-axis motion combustor handling tool in the combustor service zone, preferably under automatic control, is coupled to each combustor and facilitates precise alignment along the insertion path. Automatic control facilitates consistent repetitive combustor installation and removal by executing a sequence of stored pre-determined manipulation steps.

Embodiments of the present invention feature a method for installing a combustor assembly in an industrial gas turbine by providing an industrial gas turbine with a combustor case having a combustor access port and a transition therein that is coaxially aligned with the access port along an insertion path. A preassembled modular drop-in combustor assembly having a mounting flange adapted for coupling to the combustor access port and a combustor basket adapted for slidable coupling with the transition are slidably inserted into the access port and transition along the insertion path without impacting other turbine components. Thereafter the combustor mounting flange is coupled to the combustor access port. The preassembled combustor assembly can be inspected and pre-certified as conforming with assembly and function specifications prior to installation as a drop-in unit. The combustor assembly may be inserted with a powered multi-axis combustor handling tool (CHT) whose manipulation is preferably under automatic control, for predictably repeatable alignment manipulation motions.

Embodiments of the present invention also feature a preassembled modular drop-in combustor assembly having a mounting flange adapted for coupling to an industrial gas turbine combustor case access port and a combustor handling tool. The assembly has a combustor basket adapted for slidable coupling with a transition in a combustor case that is coaxially aligned with the access port along an insertion path. The combustor assembly internal components are in conformity with assembly and function specifications prior to and after insertion into an industrial gas turbine access port so long as the combustor assembly does not impact other turbine components during insertion. The drop-in, ready-to-use combustor assembly may be "pre-certified" as conforming with assembly and function specifications, so that field installation inspection procedures do not have to be repeated.

Embodiments of the present invention additionally feature an industrial gas turbine system, including a gas turbine having compressor, combustor and turbine sections. The combustor section has a combustor case defining a plurality of respective corresponding pairs of combustor access ports aligned in a circular array and transitions in the combustor case that are coaxially aligned along respective insertion paths. The turbine system has a plurality of preassembled modular drop-in combustor assemblies corresponding to each of the corresponding pairs of combustor access ports and transitions in the combustor section. The combustor assemblies respectively have a mounting flange adapted for coupling to the combustor access port and a combustor basket adapted for slidable coupling with the transition. The turbine system has a combustor service zone proximal the combustor case, enabling slidable insertion of each combustor assembly into its corresponding access port and transition along its corresponding insertion path without contacting other turbine system components. The turbine system preferably has a powered multi-axis motion combustor handling tool (CHT) oriented in the combustor service zone, adapted for coupled to each respective combustor assembly, for insertion thereof into the combustor case along its respective insertion path. A controller is preferably coupled to and controls movement of the combustor handling tool in a sequence of pre-determined combustor insertion manipulation steps. An embodiment of the CHT has a vertical support column and a lifting platform that is coupled to the vertical support column, for selectively varying vertical elevation relative to the combustor case. A combustor alignment platform is coupled to the lifting platform, for selectively varying transverse, axial and rotational positions relative to the combustor case. A combustor gripper is coupled to the combustor alignment platform, for coupling to the combustor.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a preassembled modular drop-in combustor having internal components in conformity with assembly and function specifications prior to and after insertion into an industrial gas turbine access port and internal combustor transition. The combustor assembly maintains conformity with those specifications after insertion into the combustor case if it does not inadvertently impact other turbine components during its installation. Inadvertent impact is avoided by having a combustor service zone proximal the combustor case, enabling slidable insertion of each combustor assembly into its corresponding access port and transition along its corresponding insertion path without contacting other turbine system external or internal components. A multi-axis motion combustor handling tool in the combustor service zone, preferably under automatic control, is coupled to each combustor and facilitates precise alignment along the insertion path. Automatic control facilitates consistent repetitive combustor installation and removal by executing a sequence of stored pre-determined manipulation steps.

Figure 1:
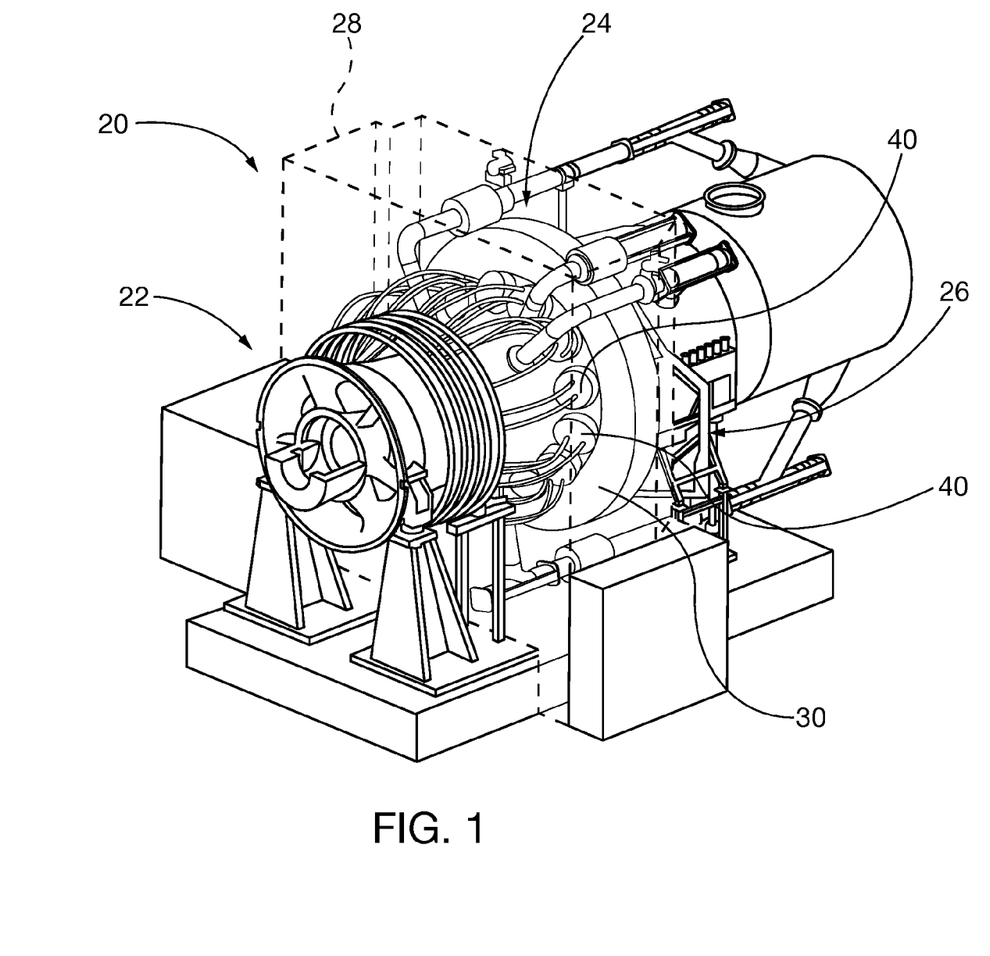
FIG. 1 shows a perspective view of an embodiment of an industrial gas turbine system of the present invention.

FIG. 1 shows an industrial gas turbine 20 of the present invention that includes compressor section 22, combustor section 24 and turbine section 26. The turbine 20 has a combustor service zone 28, depicted in dashed lines, in which all piping, wiring, etc. is removable for clear access to the combustor case 30 and the combustor assemblies 40.

Figure 2:
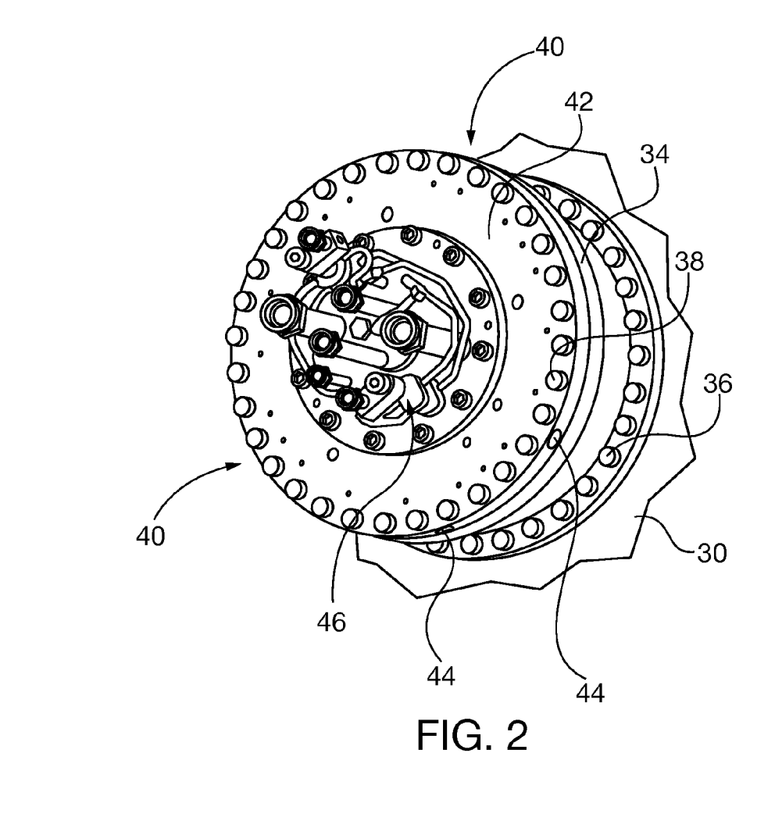
FIG. 2 shows a perspective view of an embodiment of a preassembled combustor assembly of the present invention installed in a combustor case access port of the gas turbine of FIG. 1.
Figure 3:
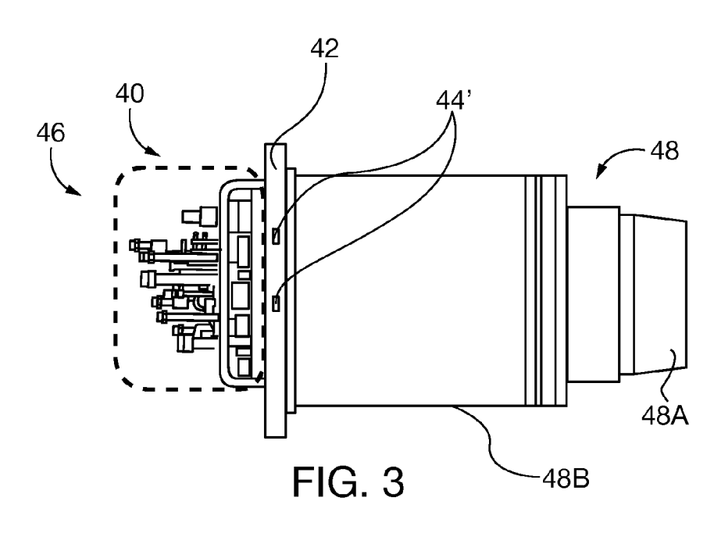
FIG. 3 shows a side elevational view of the preassembled combustor assembly of FIG. 2.
Figure 4:
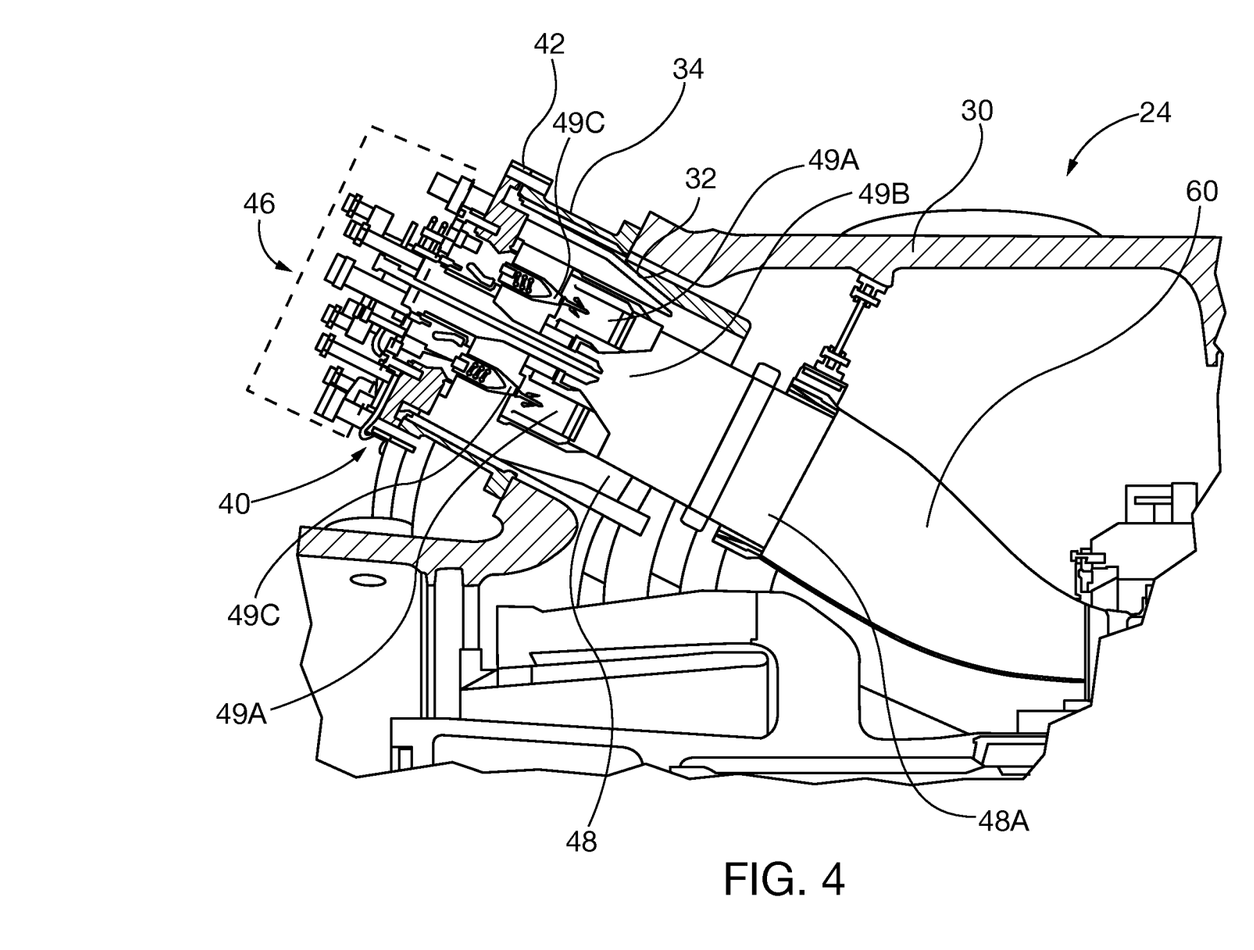
FIG. 4 shows a partial cut-away view of the a preassembled combustor assembly of FIGS. 2 and 3 installed within a combustor case of the gas turbine of FIG. 1.

Referring to FIGS. 2-4, each combustor assembly 40 has a mounting flange 42 that is coupled to the combustor case 30 access ports 32 by an intermediate spool piece 34 and circular arrays of fasteners 36, 38. The mounting flange 42 also has threaded apertures 44 four coupling to the combustor handling tool (CHT) of FIGS. 7-10. The combustor assembly 40 is preassembled and inspected for conformance with assembly and functional specifications prior to installation in the combustor case 30. Preassembled components forming the combustor assembly 40 include externally mounted fuel injectors and instrumentation 46, of known operation and construction. The combustor basket 48 is of generally annular hollow construction, and houses swirlers 49A as well as venturi 49B and combustion nozzles 49C. The tip 48A of the combustor basket 48 that is distal the combustor mounting flange 42 slidably mates with a corresponding combustor transition 60. The combustor basket tip 48A outer circumference conforms generally to the transition 60 inner diameter. The combustor basket outer circumference 48B has relatively tight radial clearance within the corresponding access port 32 inner circumference of approximately 1 inch (25 mm), compared to an approximate axial length from the combustor mounting flange 42 to the combustor basket tip 48A of at least 24 inches (600 mm). As the combustor assembly 40 ratio of radial clearance to axial length is relatively small (at least approximately 0.04), slight yawing deviations of the combustor relative to its insertion path that is established in the axial centerline between the access port 32 and transition 60 inner circumferences may cause inadvertent combustor assembly contact with turbine 20 internal components. Any such internal contact may inadvertently cause the combustor assembly 40 damage or misalignment that may cause it to deviate from alignment and/or functional specifications.

Figure 5:
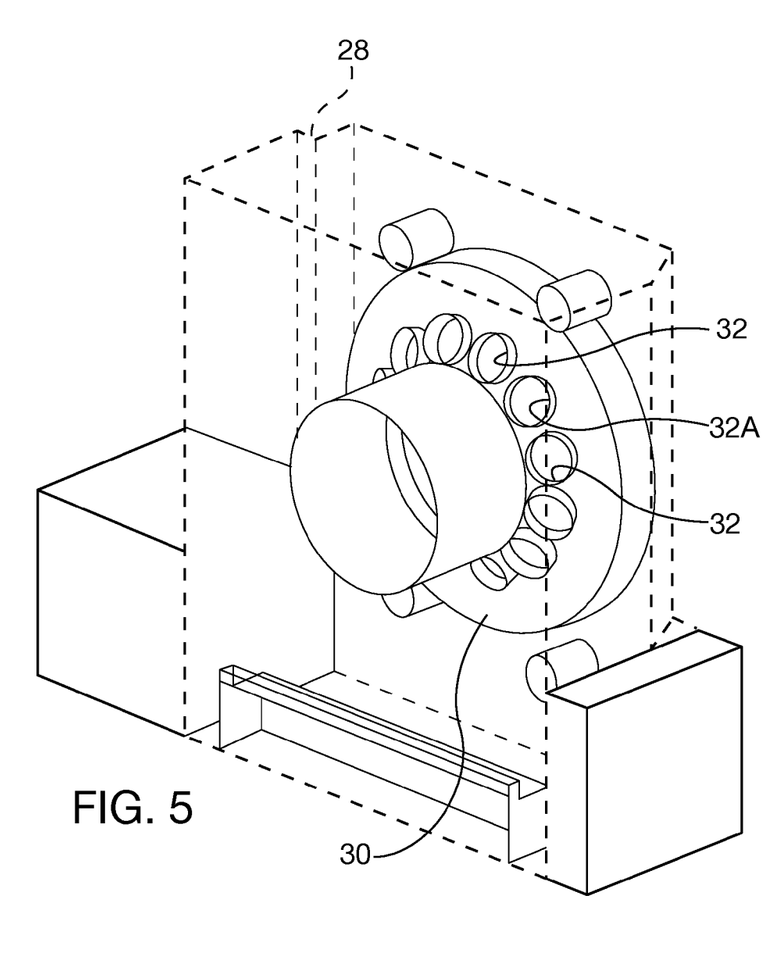
FIG. 5 shows a perspective view of an embodiment of an industrial gas turbine combustor case and access ports and combustor service zone of the present invention.
Figure 6:
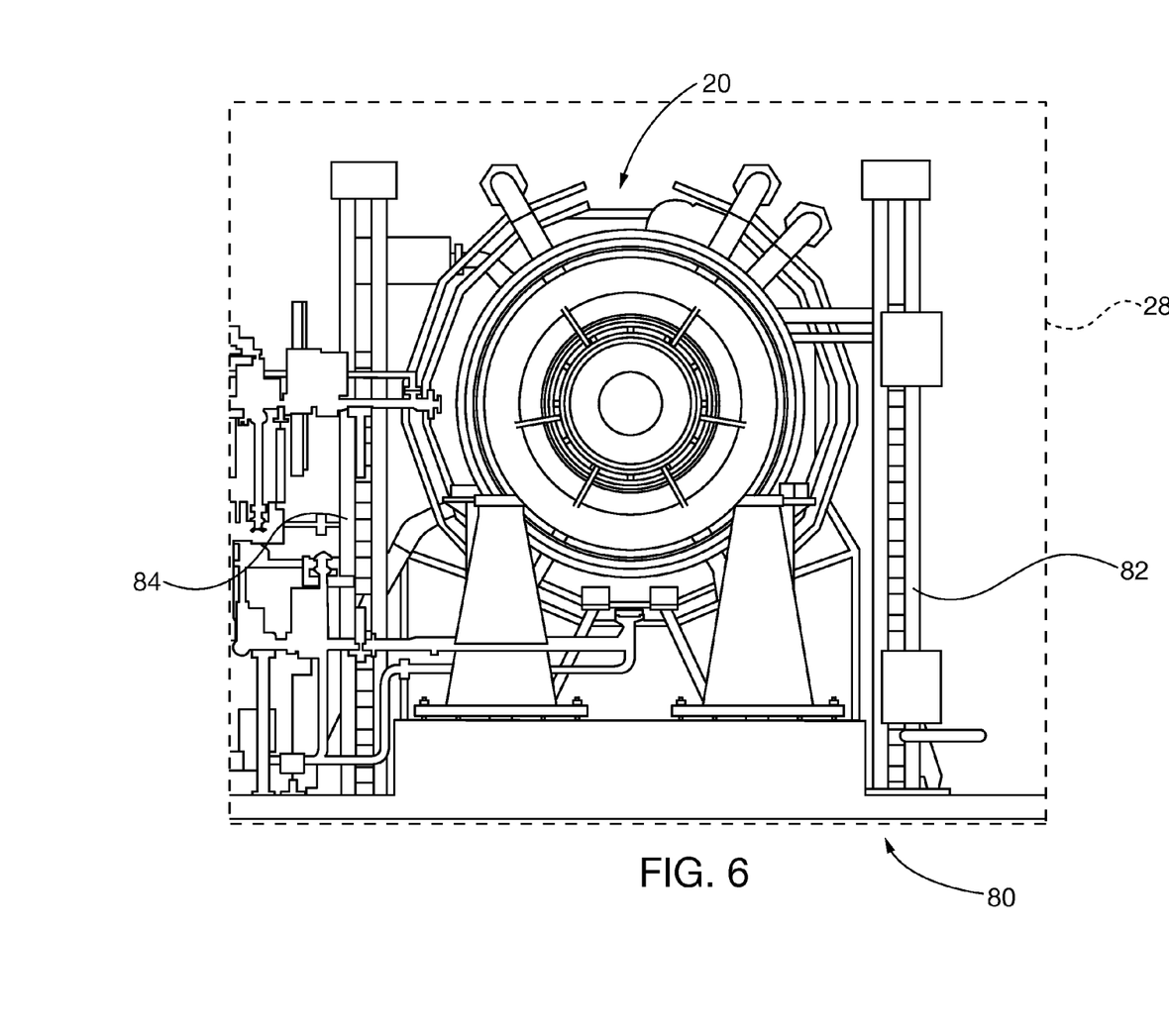
FIG. 6 shows an end elevational view of the gas turbine of FIG. 1 and vertical support columns of an embodiment of the combustor handling tool (CHT) of the present invention located within the combustor service zone.

In the gas turbine 20 of the present invention, the open, uncluttered combustor service zone 28, shown in FIGS. 1 and 5, prevents combustor assembly 40 damage while being aligned along the insertion path into the access port 32. In the service zone 28 there are no turbine external components interfering with combustor assembly maneuvering. However, as noted above, yawing misalignment deviations from the desired insertion path during combustor assembly 40 insertion into the combustor case 30 can cause damage.

Embodiments of the present invention include a combustor handling tool (CHT) 80, shown in FIGS. 6-10, that facilitates proper alignment and insertion of the relatively heavy combustor assembly 40 into its corresponding combustor case access port 32 in the combustor service zone 28 that is associated with gas turbine 20. The CHT 80 includes a right support column 82, for servicing combustor assemblies on the right side of the combustor case 30 and a left support column 84, for servicing combustor assemblies on the left side of the combustor case 30. In the preferred embodiment of the present invention separate mirror image combustor handling tools are dedicated to the respective right and left support columns 82, 84, but it is also possible to share CHT components for use on either side of the turbine 20.

Figure 7:
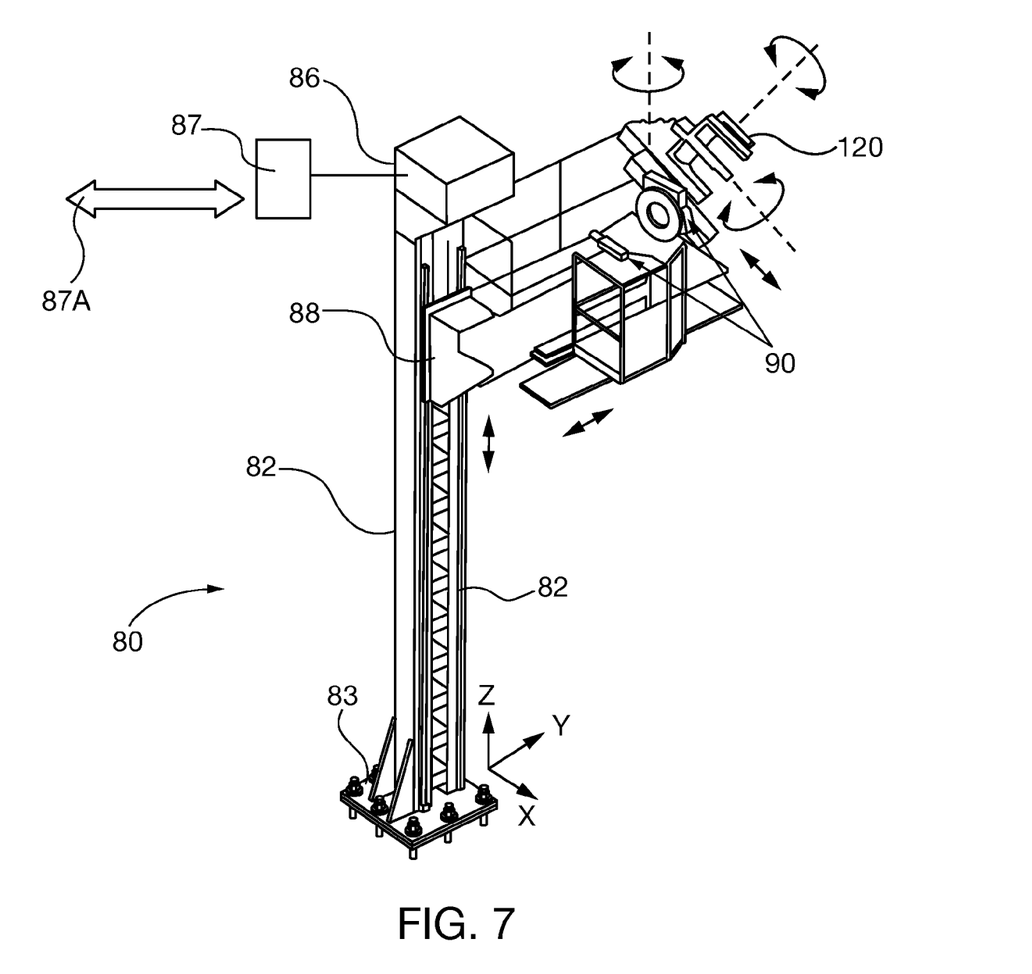
FIG. 7 is a perspective view of an embodiment of a combustor handling tool (CHT) of the present invention.

As shown in the perspective view of FIG. 7, the CHT 80 for the right column 82 is shown. A mirror image may be affixed to the left column. The right support column 82 is selectively or permanently coupled to the turbine 20 pad floor structures by foundation mounting plate 83. It is possible to move the CHT 80 and its support column 82 from facility to facility for field service, but it is preferable to leave at least one CHT permanently at a facility. A motorized or hydraulic crane drive 86 is affixed to the column 82 to provide power for moving the multi-axis CHT 80. The crane drive 86 is under control of controller 87. Alternatively, each range of motion of CHT 80 or clusters of motion ranges may be driven by separate drives under control of controller 87 or a plurality of inter-communicating controllers.

Figures 8, 9:
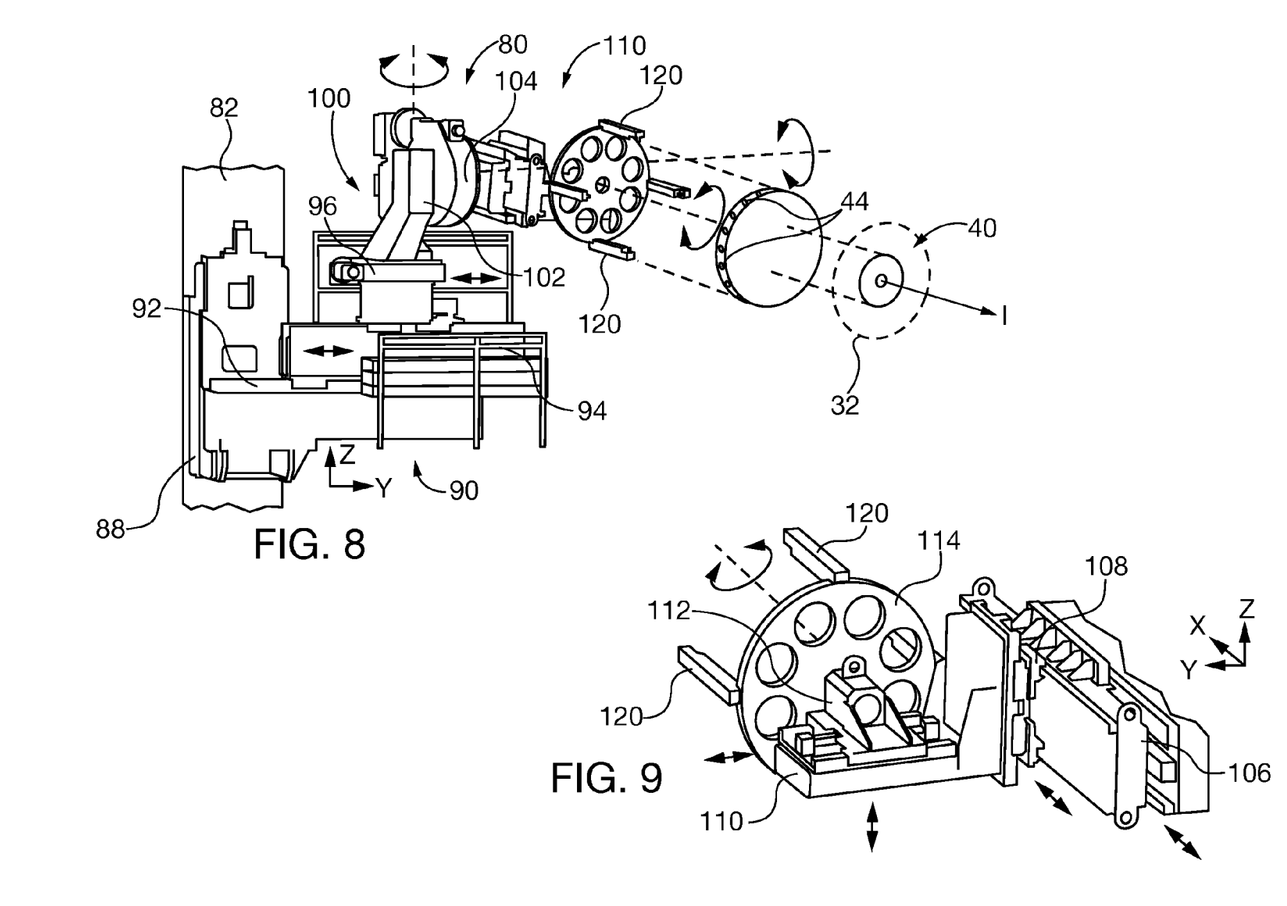
FIG. 8 is an elevational view of an embodiment of the combustor alignment platform of the CHT of FIG. 7.
FIG. 9 is a perspective view of an embodiment of the combustor alignment platform and combustor flange gripper of the CHT of FIG. 7.

As shown in FIGS. 7-9, the lifting platform 88 provides CHT vertical elevation motion in the Z axis (shown). A combustor alignment platform 90 provides gross left-right (Y axis) motion by first slider 92, second slider 94, and third slider 96. Gross fore-aft (X axis) motion for insertion of the combustor assembly 40 into the combustor case access port 32 is facilitated by fourth and fifth sliders 106, 108. Fine translation motion for final combustor assembly 40 movement, for example for centering the combustor 40 assembly concentrically within the access port 32 and transition 60 along insertion path I, is provided by slider 110 in the Z axis and slider 112 in the in the Y axis. The CHT 80 also facilitates rotational motion about the three coordinate axes. Turret assembly 100 provides pan or sweep rotation about the Z axis 102, turret assembly 104 provides tilt or inclination/declination rotation about the Y axis, and hub 114 provides rotational about the X axis (for example for aligning combustor hub 42 bolt pattern with that of the spool piece 34 for subsequent insertion of the fasteners 38.

Figure 10:
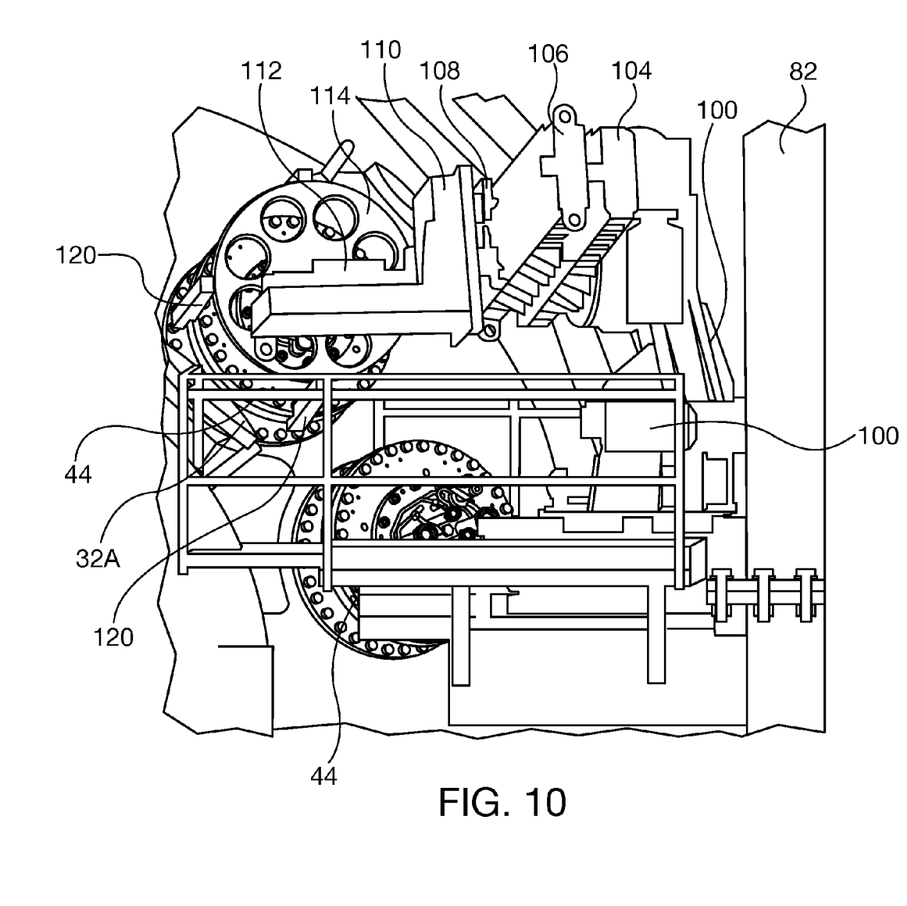
FIG. 10 is a front elevational view of the CHT of FIG. 7 installing a preassembled combustor of the present invention in the combustor service zone of the industrial gas turbine of FIG. 1.

Referring to FIGS. 9 and 10, hub 114 retains a plurality of grippers 120 that are coupled to apertures 44 in the combustor mounting flange 42 with threaded fasteners. Other types of known mechanical coupling devices may substituted for threaded fasteners and apertures 44 in the mounting flange 42, including by way of example hydro-mechanical or electro-mechanical gripper claws and mating structures in the mounting flange 42, mating keys/keyways or pins/apertures, etc. In FIG. 10 the CHT 80 is inserting a combustor assembly 40 into combustor access port 32A, that is oriented at approximately the 1 o'clock radial position in the combustor case 30 (see also FIG. 5). The CHT 80 aligns the combustor assembly 40 concentrically with the insertion path I, which needed to insert it into access port 32A and the awaiting corresponding transition 60, without inadvertently impacting the combustor basket 48 or other combustor assembly components with other turbine components within the combustor case 30.

As previously noted the CHT 80 motions are controlled by controller 87, which may be a programmable logic controller or a personal computer that utilizes a processor and operating system that accesses a stored instruction set. The controller 87 preferably stores a set of CHT 80 motion instructions needed to align and insert combustor assemblies 40 with each individual turbine access port 32 within reach of the CHT. For example in FIG. 10, the CHT 80 is capable of inserting all combustor assemblies 40 into access ports on the right side of turbine 20, and a mirror image CHT coupled to the left support column 84 inserts combustor assemblies 40 into access ports 32 on the left side of turbine 20. Motion instruction sets stored in the controller 87 are derived from virtual and/or actual CHT 80 multi-axis manipulation. A motion instruction set that successfully aligns and installs/retracts combustor assemblies 40 in combustor case access ports 32 is stored in the controller 87 and may be downloaded to other controllers. If needed, individual motion instruction sets may be modified to conform to alignment variations needed at different gas turbine installations. The controller 87 may be in wired or wireless communication with a network 87A, such as a power plant local area network or the Internet, for remote monitoring of combustor assembly installation and for receipt of updated or new motion instruction sets.

Although various embodiments that incorporate the teachings of the present invention have been shown and described in detail herein, those skilled in the art can readily devise many other varied embodiments that still incorporate these teachings. Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for installing a combustor assembly in an assembled industrial gas turbine engine, comprising:
   providing an assembled industrial gas turbine engine having coupled compressor, combustor, and turbine sections, the combustor section including a combustor case having a combustor access port and a transition therein that is coaxially aligned with the access port along a combustor insertion path;
   providing a preassembled modular drop-in combustor assembly having a mounting flange adapted for coupling to the combustor access port and a combustor basket adapted for slidable coupling with the transition once the combustor assembly is inserted into the combustor access port and transition along the combustor insertion path;
   preparing a combustor service zone surrounding the assembled gas turbine engine, for facilitating slidable insertion of the combustor assembly into the combustor access port along the combustor insertion path without contacting other gas turbine engine external or internal components, the combustor service zone having axial depth at least between the combustor section combustor access port and the compressor section, as well as vertical height and lateral width at least as large as corresponding height and width of the combustor case;
   providing a powered combustor handling tool (CHT), for slidably inserting the combustor assembly into the combustor access port along the combustor insertion path, the CHT confined within the combustor service zone during combustor assembly insertion, the CHT including:
   a vertical support column anchored outboard the combustor case within the combustor service zone axial depth;
   a lifting platform, coupled to the vertical support column, for selectively varying vertical elevation within combustor service zone;
   a combustor gripper, for coupling to the combustor assembly;
   a combustor alignment platform, coupled to the lifting platform and the combustor gripper, the combustor alignment platform including,
   a first slider set for providing selective linear translation of the combustor gripper orthogonally with respect to the vertical support column in a lateral width direction within the combustor service zone;
   a second slider set for providing selective linear translation of the combustor gripper orthogonally with respect to the vertical support column in an axial depth direction within the combustor service zone;
   a first turret assembly for providing selective tilting inclination/declination of the combustor gripper within the combustor service zone;
   and a second turret assembly for providing selective sweep/pan pivoting movements of the combustor gripper within the combustor service zone; and
   a drive system for driving the lifting platform and the combustor alignment platform elevation, translation and pivoting motions during combustor assembly insertion along the combustor insertion path;
   coupling the combustor assembly to the combustor gripper;
   slidably inserting the combustor assembly into the combustor access port and transition along the insertion path with the CHT, without contacting other gas turbine engine external or internal turbine components within or outside of the combustor service zone, while confining the CHT within the combustor service zone during the combustor assembly insertion; and
   coupling the combustor assembly mounting flange to the combustor access port.

2. The method of claim 1, comprising inspecting the combustor assembly for conformity with assembly and function specifications prior to the inserting and maintaining said assembly specifications after the inserting and coupling steps.

3. The method of claim 1, comprising a controller coupled to the drive system for automatically controlling the combustor handling tool, the controller having a sequence of pre-determined combustor assembly insertion manipulation steps.

4. The method of claim 3, comprising installing a plurality of combustor assemblies in the gas turbine with the combustor handling tool, each respective combustor assembly having a sequence of pre-determined combustor insertion manipulation steps.

5. The method of claim 1, the preassembled modular drop-in combustor assembly having internal components in conformity with assembly and function specifications prior to and after insertion into the combustor access port so long as the combustor assembly does not impact other turbine components during insertion.

6. The method of claim 5, further comprising providing combustor assembly fastening elements for coupling the mounting flange to the combustor gripper.

7. An industrial gas turbine engine combustor assembly installation system, comprising:
   an assembled industrial gas turbine engine having coupled compressor, combustor, and turbine sections, the combustor section including a combustor case having a combustor access port and a transition therein that is coaxially aligned with the combustor access port along a combustor insertion path;
   a preassembled modular drop-in combustor assembly having a mounting flange adapted for coupling to the combustor access port and a combustor basket adapted for slidable coupling with the transition once the combustor assembly is inserted into the combustor access port and transition along the combustor insertion path;
   a combustor service zone surrounding the assembled gas turbine engine, for facilitating slidable insertion of the combustor assembly into the combustor access port along the combustor insertion path without contacting other gas turbine engine external or internal components, the combustor service zone having axial depth at least between the combustor section combustor access port and the compressor section, as well as vertical height and lateral width at least as large as corresponding height and width of the combustor case;

a powered combustor handling tool (CHT), for slidably inserting the combustor assembly into the combustor access port along the combustor insertion path, the CHT confined within the combustor service zone during combustor assembly insertion, so as to avoid contacting other gas turbine engine external or internal turbine components within or outside of the combustor service zone, the CHT including:

a vertical support column anchored outboard the combustor case within the combustor service zone axial depth;

a lifting platform, coupled to the vertical support column, for selectively varying vertical elevation within combustor service zone;

a combustor gripper coupled to the combustor assembly;

a combustor alignment platform, coupled to the lifting platform and the combustor gripper, the combustor alignment platform including a first slider set for providing selective linear translation of the combustor gripper orthogonally with respect to the vertical support column in a lateral width direction within the combustor service zone;

a second slider set for providing selective linear translation of the combustor gripper orthogonally with respect to the vertical support column in an axial depth direction within the combustor service zone;

a first turret assembly for selective tilting inclination/declination of the combustor gripper within the combustor service zone;

and a second turret assembly for selective sweep/pan pivoting movements of the combustor gripper within the combustor service zone; and a drive system for driving the lifting platform and the combustor alignment platform elevation, translation and pivoting motions during combustor assembly insertion along the combustor insertion path.

8. The system of claim 7, each combustor assembly having internal components in conformity with assembly and function specifications prior to and after insertion into the combustor access port so long as the combustor assembly does not impact other turbine system components during insertion.

9. The system of claim 7, comprising a controller coupled to the CHT drive system and controlling movement of the combustor handling tool in a sequence of pre-determined combustor insertion manipulation steps.

10. The system of claim 7, the combustor assembly having fastening elements coupled to the mounting flange and the combustor gripper.

* * * * *